June 23, 1953 J. A. GREGOIRE 2,643,110
SUSPENSION OF VEHICLES
Filed Dec. 15, 1947 5 Sheets-Sheet 1

Jean Albert Gregoire
Inventor by Jewett and Mead
Attorneys

June 23, 1953  J. A. GREGOIRE  2,643,110
SUSPENSION OF VEHICLES
Filed Dec. 15, 1947  5 Sheets-Sheet 5
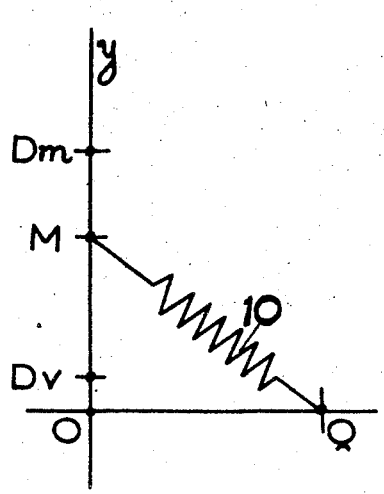
FIG.5.
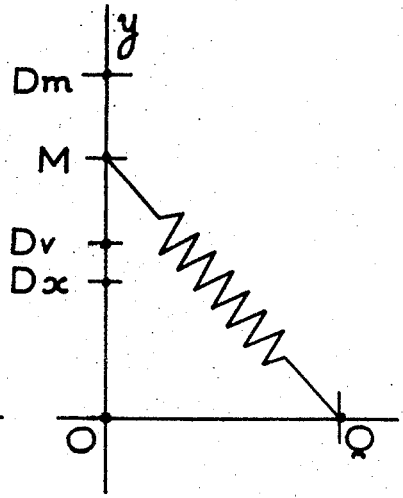
FIG.6.
FIG.7.  FIG.8.
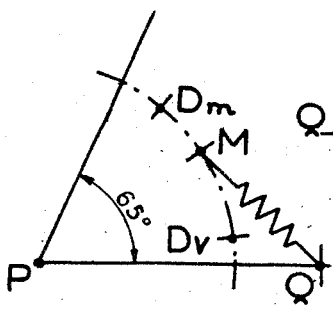
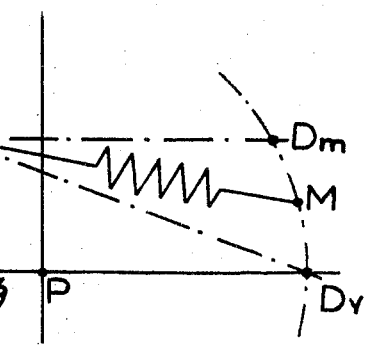
Jean Albert Gregoire
Inventor
by Jewitt and Mead
Attorneys Patented June 23, 1953

2,643,110

UNITED STATES PATENT OFFICE 2,643,110

SUSPENSION OF VEHICLES

Jean Albert Gregoire, Paris, France

Application December 15, 1947, Serial No. 791,838
In France July 11, 1947

6 Claims. (Cl. 267—28)

The present application is in part a continuation of my co-pending application Ser. No. 626,101 of November 11, 1945, now Patent No. 2,616,686, issued November 4, 1952. My present invention has for its object suspension means for vehicles of any type operating for road or railroad transportation.

It is a known fact that the suspensions now used on vehicles show properties that vary generally with the load of the vehicle. When the suspension is sufficiently comfortable under full load conditions, it is too rigid when the vehicle is empty or but little loaded. When on the contrary the suspension is designed so as to be excellent for small loads, the road behaviour of the vehicle is on the other hand unsatisfactory when the vehicle is under full load. This is due to the fact that in said suspension the flexibility, that is the ratio between the increase of the sag and the increase of the load is constant or substantially constant for all loads whereas for obtaining sufficient comfort for varying loads, this flexibility should vary in a direct ratio with the load.

The present invention has for its object primarily the execution of suspensions with a variable flexibility, said flexibility varying in accordance with the load of the vehicle and being capable of adjustment in a manner such as to ensure improved conditions of operation for all loads of the vehicle. It has moreover for its object an automatic adaptation of the suspension to the load of the vehicle while providing a considerably improved comfort together with a road behaviour as perfect as possible. It has for its object moreover the execution of simple, practical and substantially cheap suspensions.

It has for its further object the possibility of an easy and cheap modification of most suspension systems operating under constant flexibility as now in use, that do not generally provide a satisfactory operation under all vehicle loads, such a modification allowing a variable flexibility suspension with considerably improved qualities. My invention has lastly for its object the execution of variable flexibility suspensions, the weight of which is less than that of the corresponding suspensions of the constant flexibility type.

In my above mentioned co-pending application Ser. No. 626,101 I have disclosed how the usual suspension means of the ordinary constant flexibility type, designed as they are generally are for operating under optimum conditions when the load of the vehicle is at a maximum, provide a suspension that is much too rigid when the vehicle runs with reduced loads.

In order to obtain improved suspension properties, whatever may be the load of the vehicle, it is therefore necessary for the suspension itself to assume a flexibility that varies with the load and becomes less when the load increases.

In my above co-pending application, I have described a suspension device of variable flexibility incorporating coiled springs or the like elastic members that are slopingly arranged with reference to the arms or levers to which they are pivotally secured and I have shown in said application that the suspension incorporating such sloping elastic members assumes a flexibility varying in the proper direction, so that said suspension shows considerable advantages with reference to the ordinary suspensions used to this day.

The present invention allows still further improving the suspension in many cases with reference to that disclosed in said co-pending application.

Before specifying the features of my invention, I will first define certain expressions that will be used in the disclosure of my invention.

I will call hereinafter:

"Position under zero load," the position of the suspension of the vehicle when supposed to be mounted on a jack, that is with its springs in their completely expanded state.

"Position when empty," the position of the suspension of the said vehicle resting on its wheels and carrying no useful load, the driver being on his seat.

Lastly "position of maximum shift or position of maximum stress," the position of the vehicle under full load at the moment of an intense jerk during which the axle abuts against the frame or against a special stop provided underneath the frame.

This being understood, the present invention consists chiefly in associating a first suspension means of any type executed in a manner such that said first suspension means may carry a part of the load in the position when empty, with a second suspension means of variable flexibility, the total flexibility of the two suspension means decreasing gradually starting from the position when empty up to the position of maximum shift. The first suspension means referred to may in particular be a suspension device of the usual constant flexibility type.

To avoid any confusion in the disclosure between said two suspension means, the first suspension means will be termed, for sake of simplicity, in all cases in the following description, and appended claims "a constant flexibility suspension," although it may in fact be also constituted by a variable flexibility suspension.

Further objects of the present invention will appear in the following description relating to accompanying drawings illustrating diagrammatically by way of example and by no means in a binding sense various forms of execution of the present invention. In said drawings:

Figs. 5 to 8 are diagrams relating to the operation of the different arrangements illustrated.

It is a matter of common knowledge that the mechanical connection between the suspended and nonsuspended parts of a vehicle may be executed in different manners, either by means of levers or arms for instance, in which case the suspended part follows a circular track or else by means of vertical slideways in which case the suspended and nonsuspended parts move vertically with reference to one another or again by means of other pivoting linkages or lastly through the agency of the suspension means themselves, constituted for instance by semi-elliptic springs, in which case, in accordance with the arrangement illustrated, the suspended and nonsuspended components of the vehicle describe with reference to one another curves that are in practice similar to the circular tracks mentioned in the first place.

Figure 1:
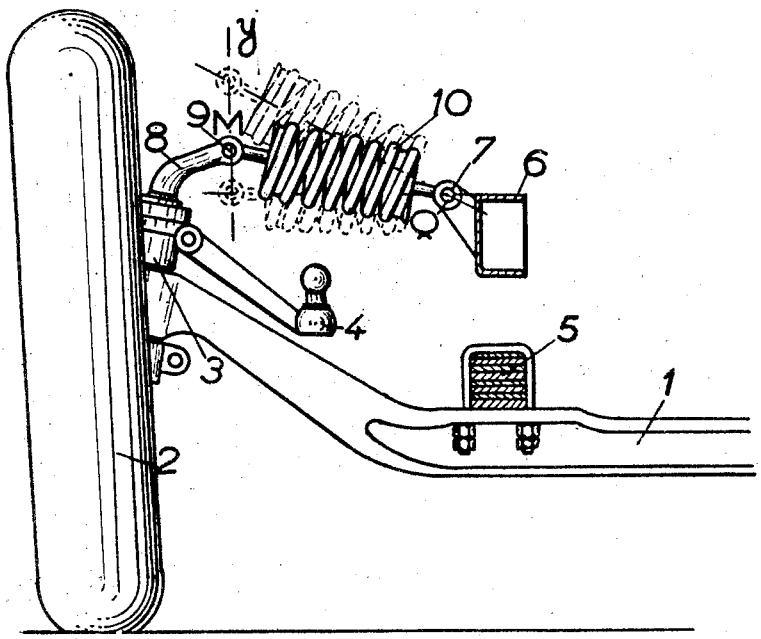
Fig. 1 is a front view of a suspension system according to my invention as applied to the suspension of a front wheel of an automobile that is only a steering wheel, the suspension means of constant flexibility being constituted for instance by a semielliptic spring.

Turning to Fig. 1, 1 designates the wheel 2 carrying the front axle through the agency of the axle journal 3. 4 designates the steering lever and 5 the suspension spring of the constant flexibility system which may be for instance a semielliptic spring and that is illustrated cross-sectionally. The means for securing said spring to the frame is irrelevant. 6 designates the part of the frame constituting the suspended component of the vehicle to which is secured the variable flexibility suspension means. To this purpose the frame 6 includes a pivot or bearing 7 and, on the other hand, the member supporting the axle journal 8 of the wheel 2 carries another link member 9. The spring of the variable flexibility suspension means 10 is a helical spring pivotally secured between the members 7 and 9 respectively at the points designated by Q and M.

In this form of execution the projection of the point M on the plane of the figure moves with reference to the frame along a vertical line Oy. The point O designates the position assumed by the end M of the spring in the case where the axis of the latter is perpendicular to the path Oy. In fact, in certain forms of execution, said position cannot be actually reached by said point M, as will be disclosed hereinafter.

The spring is designed so as to operate under tractional stresses.

In this form of execution of the arrangement, the spring 10 assumes the position QO or a position approximating the latter for the position of the vehicle when empty and its stress for said position is chosen equal to zero or to a very small value, which corresponds to the fact that the length of the released spring is substantially equal to the length QO. The spring of the constant flexibility suspension means carries then for this empty position the almost totality of the load. Moreover the flexibilty of the variable flexibility device is then practically infinite and the resultant flexibility of the suspension means is for said position equal to that of the constant flexibility suspension considered alone. As the load increases, the coil M moves over Oy and the spring 10 stretches gradually until it reaches its position of maximum stress. Instead of giving a substantialliy zero stress to the spring 10 for the position OQ, it is also possible, according to the invention, to give it a substantial initial stress which means the length of the spring in its released position is less than QO; but this form of execution is generally of lesser advantage than that disclosed hereinabove. Finally, it is also possible to make use of the arrangements illustrated diagrammatically in Figs. 5 and 6.

In said figures, the references are the same as in Fig. 1. Furthermore, Dv designates the position occupied by the point M corresponding to the vehicle when empty and Dm the position in the position of maximum stress.

In Fig. 5, the length of the spring 10 when released is equal to or less than the length QO as in the preceding case, but the position of Dv for the position when empty is then taken above the line QO. The spring assumes thus a position that is always sloping with reference to QO, whatever may be the load of the vehicle. It is also apparent from Fig. 5 that the minimum separation between the pivot points Q and M occurs between the positions of the vehicle body heretofore designated as the "when empty" position and the "zero load" position. In other words, Dv represents the position of point M for the said "when empty" position and the separation between Q and Dv is obviously greater than the separation between Q and O. Also, for the position of "zero load" wherein the vehicle is supposed to be mounted on a jack so that its springs will be in their completely expanded state, the point M will obviously lie below the point O and therefore the separation between points Q and M will be greater than the separation between Q and O. It is further apparent from Fig. 5 that the elastic extension device has a substantial angular shift in going from Dv to Dm, and this shift is in excess of twenty degrees.

In Fig. 6, I use a spring working continuously under tractional stresses, but in this case the position for which the spring is submitted to a zero stress is no longer the position QO perpendicular to the vertical track Oy as hereinabove, but a sloping position QDx for which the point at which the spring is secured to the vehicle frame is at a level underneath the point at which the spring is attached to the nonsuspended component of the vehicle. In this case, the point Dx lies on the line Oy above the point O. In the other forms of execution described hereinafter, the point Dx corresponds in a similar manner to the position of the end of the spring of the variable flexibility system when the spring is submitted to a zero stress. Said point Dx may moreover be located as disclosed hereinafter outside the allowed travel of the point M and consequently, in this case, the position QDx is, in practice, never reached by the spring.

In the present case of Fig 6, the position D$v$ corresponding to the position when empty is selected preferably in the vicinity of said point D$x$ and the spring is caused to be shifted between said position up to a position corresponding to maximum shift or stress D$m$ while its slope with reference to horizontality increases at the same time. The last mentioned arrangement allows, chiefly when the point D$v$ is quite near D$x$, the obtention of comparatively good results; but it requires that the point of attachment between the spring and the suspended part may lie at a level underneath the point of attachment of the spring to the nonsuspended component even for the position when empty. In practice, this leads to certain problems as to the location of the parts, which problems may in certain cases be more or less difficult to solve.

Figure 2:
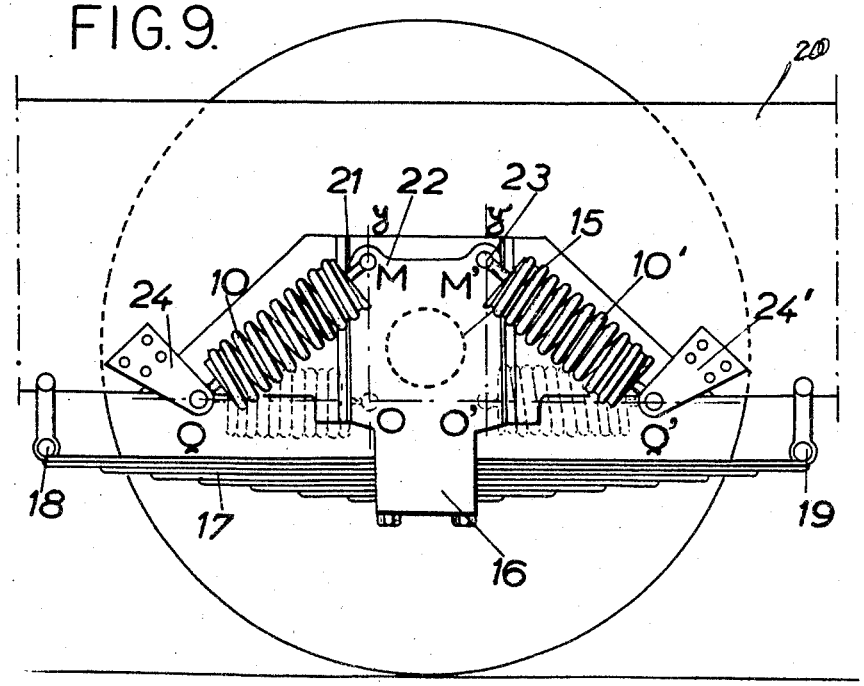
Fig. 2 shows another form of execution applicable to the suspension of the axle of a self-propelling vehicle.

Fig. 2 shows a suspension system applicable to a self-propelling rail-vehicle. The axle 15 of this vehicle rotates inside an axle box 16 secured to a semi-elliptical spring 17 connected through shackles 18 and 19 to the girders 20 of the vehicle. The axle box 16 is slidingly carried in a slideway 21 rigid with said girders 20, whereby the axle box is constrained to execute a vertical movement.

The axle box 16 carries two studs 22—23 to which are pivotally secured at M and M1 the ends of two helical springs 10 and 10' acting tractionally while their other ends engage at Q and Q' brackets 24 and 24' carried rigidly by the girders 20. The straight lines O$y$ and O$y'$ appearing in dot and dash lines designate paths of travel for the corresponding points M and M1 during the vertical movements of the suspension means. As will be obvious from viewing Fig. 2, the length of each of the helical springs 10 and 10' is substantially less than one-half of the length of the semi-elliptical spring 17.

Such a suspension arrangement operates under the same conditions as the arrangement of Fig. 1 and shows the same possibilities of application as disclosed precedingly.

The use of two springs instead of only one for the variable flexibility suspension means may show certain advantages in practice: the stresses exerted laterally to either side of the axle compensate one another and furthermore each spring may be weaker and therefore smaller individually so that the system as a whole may in certain cases be housed more easily.

Figure 3:
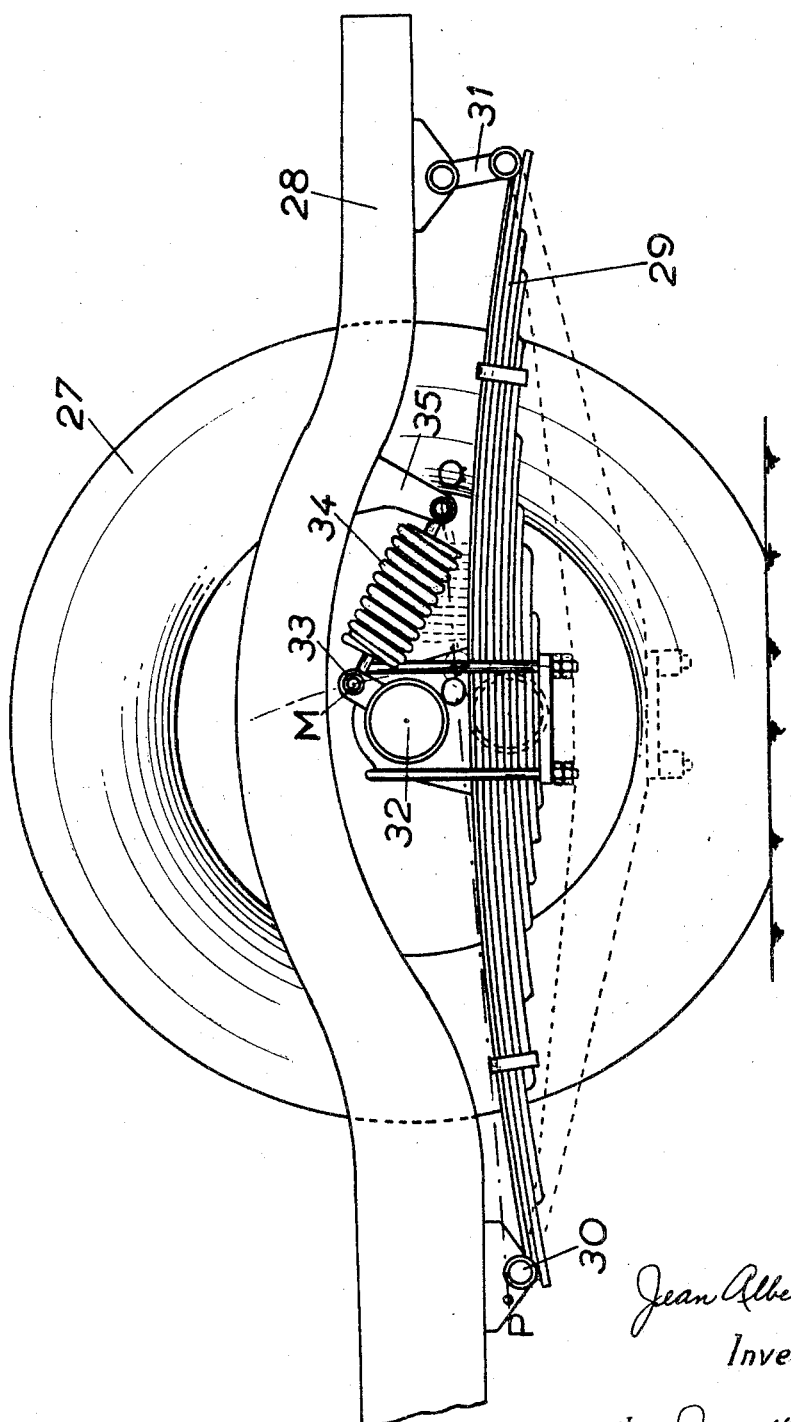
Figs. 3 and 4 illustrate other forms of execution as applied to the suspension of the rear wheel of an automobile.

Fig. 3 shows a rear suspension for an automobile vehicle, 27 designating the wheel, 28 one of the girders of the frame to which the constant flexibility suspension spring 29 is pivotally secured that is constituted for instance by a semi-elliptic spring, the front end of which is pivotally secured directly at 30 to the frame while its rear end is pivotally secured to the shackles 31 pivotally secured to the frame. 32 designates the rear axle secured in the usual manner to the central part of the spring 29. When the wheel is vertically shifted, the movement of the axle 32 with reference to the frame 28 may be considered as executed along an arc of a circle having as a center the point P near the front end of the spring 29. The axle is rigid with a bracket 33, the center of which is shown at M and to which is secured the end of the helical spring 34 forming one of the elements of the variable flexibility suspension means. The other end of this spring is pivotally secured at Q to a bracket or the like bearing 35 rigid with the frame 28. When the axle is shifted vertically, the point M describes a curve that may be considered as the arc of a circle having as a center the point P referred to hereinabove, the arcuate path of point M being shown as a dot and dash line. As will be obvious from viewing Fig. 3, the length of helical spring 34 is substantially less than one-half of the length of the semi-elliptical spring 29.

The arrangement just disclosed differs from the preceding arrangement as concerns the variable flexibility suspension means through the fact that the end of the spring describes a curve corresponding substantially to the arc of a circle located in the plane of displacement of the axis of the spring instead of describing a substantially rectilinear path. It shows however the same possibilities of application as the preceding arrangements; in other words, the point M is adapted to move between a position D$v$ and a position D$m$ no longer along a vertical line but along the arc of a circle, said points D$v$ and D$m$ being located with reference to the position O and possibly with reference to the point D$x$ of zero stress in the manner disclosed hereinabove. The preferred arrangement is that for which in the position corresponding to the vehicle when empty, M coincides with O.

However the point of maximum shift D$m$ which in the preceding cases may be chosen as desired on O$y$ should be held within the range of travel defined as disclosed hereinafter with reference to Fig. 7: the point P being as stated the center of an arc of a circle corresponding to the path of the point M, the angle QPD$m$ should be less than 65°.

As for the point corresponding to the vehicle when empty D$v$, it may be selected in the same manner as precedingly but always of course above the point O.

The same conditions would appear again in the case where the end M of the spring instead of being rigid with a point of a blade spring is rigid with a lever arm pivoting round a point P, the constant flexibility suspension means being otherwise of any description whatever. The conditions of operation are governed as a matter of fact solely by the fact that the point M describes an arc of a circle located in a plane passing through the point Q.

Figure 9:
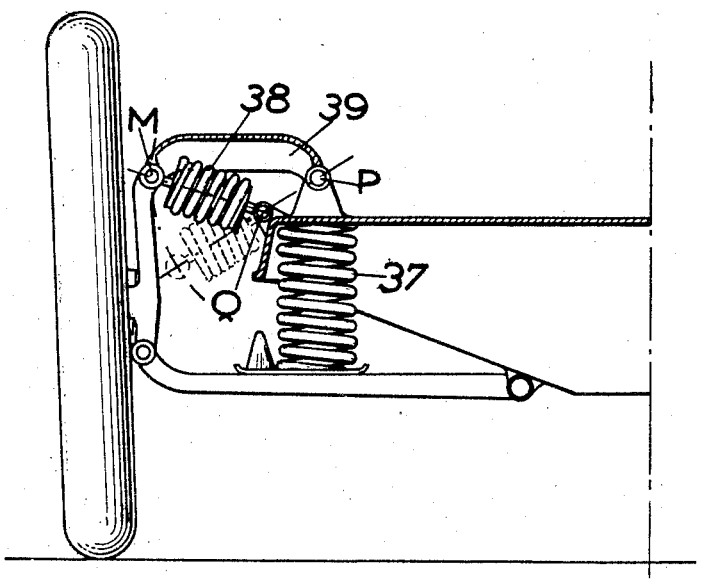
Fig. 9 illustrates a modification thereof.

An example of such an arrangement is illustrated in Fig. 9 corresponding to a suspension system for front steering wheels that are not driving wheels. In the case considered, the constant flexibility suspension means are constituted by a spiral spring arranged vertically as shown at 37; on the other hand the variable flexibility spring 38 is secured to a lever 39 pivotally secured at P to the frame of the vehicle. The point of connection between said spring 39 and the arm or lever 39 is shown at M, which latter point obviously describes an arc of a circle round the point P as a center.

Figure 4:
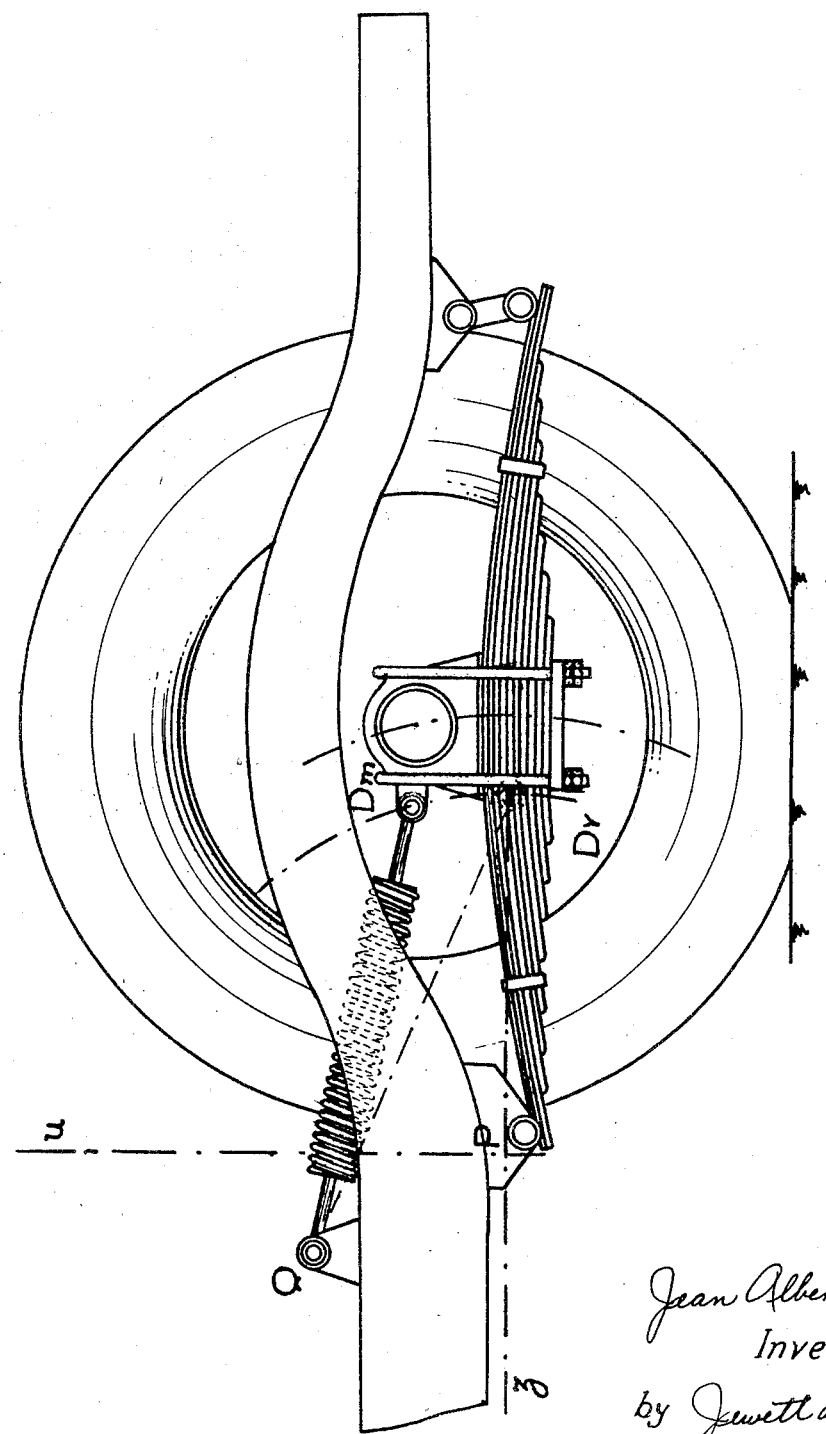

Fig. 4 illustrates an arrangement wherein the constant flexibility suspension means is the same as in the preceding case. It differs from the suspension system of Fig. 3, solely through the fact that the spring of the variable flexibility system, instead of being operative between the position corresponding to the vehicle when empty and the maximum shift position, while it is submitted to a constant increase of length, is operative within the same range under permanent shortening conditions. The diagram of Fig. 7 shows the possibilities of operation of such an arrangement.

With the same references as precedingly, if a straight line PD$v$ is drawn in Fig. 4 and a perpendicular P$u$ thereto, it is necessary in order that the arrangement may operate for the point Q to be located inside the right angle $z$P$u$.

The point D$x$ of zero stress may be located above D$m$. The spring of the variable flexibility system acts then constantly under tractional conditions.

Such an arrangement however is generally more bulky and less efficient than the preceding arrangement.

At any rate, and whatever arrangement may be used, the following very important fact should be remarked, that consists in that the combination of a variable flexibility arrangement with a constant flexibility arrangement is by no means under the conditions of application considered, a mere juxtaposition of two different suspension means. At first sight, it may be believed as a matter of fact that such an association should have a flexibility that is variable to a lesser extent than the variable flexibility system used alone. Now this is not the case and as a matter of fact the association of suspension means according to invention as described allows obtaining flexibilities that vary to a greater extent than in the case of the use of the variable flexibility suspension alone. This is ascribable to the following reasons:

When it is desired to establish a suspension, it is necessary for the latter, in the position when empty, to support the weight of the suspended component of the vehicle and to assume for said value a certain flexibility. In the case where a variable flexibility device is used alone, it is necessary to constrain the latter at the start to fulfill certain conditions that are comparatively strict, whereby it is necessary to make the arrangement operate under conditions that are far from being the optimum conditions.

On the contrary, my association of a constant flexibility system with a variable flexibility system allows the load to be carried at the start by the constant flexibility device alone so that it is possible to choose for the variable flexibility device conditions of operation that are much more favorable than in the preceding case. In particular, as disclosed hereinabove, it is possible to choose for the variable flexibility arrangement when in a position near the position when empty, a flexibility that is substantially infinite. As on the other hand, it is possible in practice to bring the flexibility of such a device through deformation thereof to a value as low as may be desired and depending only on the grade of the spring used, it is possible to obtain for the total resulting flexibility a very high variation that is in practice clearly above that obtained with a variable flexibility arrangement when used alone, as stated hereinabove.

The practical exemplification disclosed hereinafter and referring to a delivery van provided with a suspension of the type shown in Fig. 3 illustrates this fact. This delivery van when suspended in the usual manner has a suspension the constant flexibility of which is equal to 9, that is for an overload of 100 kgs., the frame sinks by about 9 mm. whatever the total load may be.

When the delivery van is provided with an arrangement according to my invention, as shown in Fig. 3, the data concerning the suspension are as follows:

Alignment of the points POQ for position under zero load, as shown in chain lines, in Fig. 3.

Position when empty corresponding to a shift of 20 mm. with reference to zero load position.

Position of maximum shift corresponding to a sag of 100 mm.

In the position when empty, the total flexibility of the associated suspension is equal to 12 while in the maximum shift position it is only of 6; in other words, the flexibility between the position when empty and the position of maximum shift is reduced by one half. The comfort and the road behaviour of the delivery van are thus improved to a considerable extent.

Considering furthermore that in practice the difficulties of housing a variable flexibility spring according to my invention have not allowed in the case considered obtaining the maximum efficiency of such a spring, it will be easy to ascertain the remarkable results that may be reached through the above disclosed associated suspension means.

Obviously, many modifications may be brought to the arrangement described without widening thereby the scope of the invention.

In particular, the invention is by no means limited to the use as a variable flexibility arrangement incorporated to the association according to the invention, of coiled springs arranged obliquely as described hereinabove. I may use to the same purpose any other variable flexibility system such as for instance a system of springs or elastic members cooperating with pivoting link systems, the variations in length of which are not proportional to the variations in length of the springs. Lastly, the arrangements according to my invention may be associated with any type of damping systems.

The so-called constant flexibility suspension means may also be replaced by an arrangement showing a variable flexibility such for instance as that described in my above mentioned co-pending specification which latter should then operate in a manner such as to carry the major part of the weight of the vehicle in the vicinity of zero load.

What I claim is:

1. A vehicle suspension for suspending a vehicle body with respect to a vehicle wheeled support, said suspension comprising main spring means connected between said vehicle body and said vehicle wheeled support, said main spring means supporting substantially the whole body load of the vehicle in the position "when empty," and supplemental spring means including an elastic extension device pivoted at its ends on the vehicle body and on the vehicle wheeled support, respectively, at points having their minimum separation for a position of the vehicle body intermediate the position "when empty" and the position of "zero load," said elastic extension device being under tension at said "when empty" position and increasing in length and resistance as the body load increases.

2. A vehicle suspension for suspending a vehicle body with respect to a vehicle wheeled support, said suspension comprising main spring means connected between the vehicle body and the vehicle wheeled support, said main spring means supporting substantially the whole body load of the vehicle in the position "when empty," and supplemental spring means including an elastic extension device pivoted at its ends on the vehicle body and on the vehicle wheeled support, respectively, at points having their minimum separation for a position of the vehicle body intermediate the position "when empty" and the position of "zero load," said elastic extension device being under tension at said "when empty" position and increasing in length and resistance as the body load increases, and said elastic extension device having an angular shift with respect to said vehicle body greater than twenty degrees when the vehicle body shifts from the "when empty" position to the position of "maximum shift."

3. A vehicle suspension for suspending a vehicle body with respect to a vehicle wheeled support, said suspension comprising a semi-elliptical spring means connected between said vehicle body and said vehicle wheeled support, said semi-elliptical spring means supporting substantially the whole body load of the vehicle in the position "when empty," and supplemental spring means including at least one elastic extension device pivoted at its ends on the vehicle body and on the vehicle wheeled support, respectively, at points having their minimum separation for a position of the vehicle body intermediate the position "when empty" and the position of "zero load," the length of said elastic extension device being substantially less than one-half of the length of said semi-elliptical spring means at said "when empty" position, and said elastic extension device being under tension at said "when empty" position and increasing in length and resistance as the body load increases.

4. A vehicle suspension for suspending a vehicle body with respect to a vehicle wheeled support, said suspension comprising main spring means connected between said vehicle body and said vehicle wheeled support, said main spring means supporting substantially the whole body load of the vehicle in the position "when empty," and supplemental spring means including an elastic extension device pivoted at its ends on the vehicle body and on the vehicle wheeled support, respectively, at points having their minimum separation for a position of the vehicle body intermediate the position "when empty" and the position of "zero load," said elastic extension device being under substantially no tension when the pivot points thereof are at their minimum separation and increasing in length and resistance as the body load increases.

5. A vehicle suspension for suspending a vehicle body with respect to a vehicle wheeled support, said suspension comprising main spring means connected between said vehicle body and said vehicle wheeled support, said main spring means supporting substantially the whole body load of the vehicle in the position "when empty," and supplemental spring means including at least one coil spring pivoted at its ends on the vehicle body and on the vehicle wheeled support, respectively, at points having their minimum separation for a position of the vehicle body intermediate the position "when empty" and the position of "zero load," said coil spring having its axis inclined slightly with respect to horizontal and being under tension at said "when empty" position, and said coil spring increasing in length and resistance as the body load increases.

6. A vehicle suspension for suspending a vehicle body with respect to a vehicle wheeled support, said suspension comprising main spring means connected between the vehicle body and the vehicle wheeled support, said main spring means supporting substantially the whole body load of the vehicle in the position "when empty," and supplemental spring means including at least one coil spring pivoted at its ends on the vehicle body and on the vehicle wheeled support, respectively, at points having their minimum separation for a position of the vehicle body intermediate the position "when empty" and the position of "zero load," said coil spring being under substantially no tension when the pivot points thereof are at their minimum separation and increasing in length and resistance as the body load increases, and said coil spring having an angular shift with respect to said vehicle body greater than twenty degrees, when the vehicle body shifts from the "when empty" position to the position of "maximum shift," whereby said supplemental spring means supports a substantial part of the body load when the vehicle suspension is under maximum stress.

JEAN ALBERT GREGOIRE.

References Cited in the file of this patent

UNITED STATES PATENTS

| Number | Name | Date |
|---|---|---|
| 709,396 | Corssen | Sept. 16, 1902 |
| 1,189,682 | Gingras | July 4, 1916 |
| 1,208,157 | Hien | Dec. 12, 1916 |
| 1,587,116 | Graves | June 1, 1926 |
| 1,773,218 | Carwardine | Aug. 19, 1930 |
| 2,264,070 | Davis | Nov. 25, 1941 |
| 2,413,291 | Chapin | Dec. 31, 1946 |

FOREIGN PATENTS

| Number | Country | Date |
|---|---|---|
| 21,442 of 1912 | Great Britain | Sept. 18, 1913 |
| 120,406 | Switzerland | July 1, 1927 |
| 904,561 | France | Mar. 5, 1945 |